(12) United States Patent
Fujii

(10) Patent No.: US 7,796,749 B2
(45) Date of Patent: Sep. 14, 2010

(54) ELECTRONIC DEVICE

(75) Inventor: Kouhei Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 491 days.

(21) Appl. No.: 11/794,545

(22) PCT Filed: Dec. 26, 2005

(86) PCT No.: PCT/JP2005/023826

§ 371 (c)(1),
(2), (4) Date: Jul. 2, 2007

(87) PCT Pub. No.: WO2006/073082

PCT Pub. Date: Jul. 13, 2006

(65) Prior Publication Data

US 2008/0044007 A1 Feb. 21, 2008

(30) Foreign Application Priority Data

Jan. 6, 2005 (JP) ............................. 2005-001792

(51) Int. Cl.
*H04M 1/00* (2006.01)
*H04M 9/00* (2006.01)
(52) U.S. Cl. ........................... 379/433.13; 379/433.01; 455/575.3

(58) Field of Classification Search ............ 379/433.01, 379/433.11, 433.13; 455/575.1, 575.3; 16/366, 16/368, 369; 361/679.02, 679.08, 679.21, 361/679.26–679.28
See application file for complete search history.

(56) References Cited

U.S. PATENT DOCUMENTS 5,644,469 A 7/1997 Shioya et al.

FOREIGN PATENT DOCUMENTS

| EP | 1 217 501 | | 6/2002 |
|---|---|---|---|
| JP | 60-160418 | A | 8/1985 |
| JP | 8-332849 | | 12/1996 |
| JP | 10-190795 | | 7/1998 |
| JP | 11-038716 | | 2/1999 |
| JP | 2002-011765 | A | 1/2002 |
| JP | 2002-152355 | A | 5/2002 |
| JP | 2003-167645 | A | 6/2003 |
| JP | 2003-233435 | A | 8/2003 |
| JP | 2003-273992 | A | 9/2003 |
| JP | 2004-235687 | A | 8/2004 |

*Primary Examiner*—Tuan D Nguyen
(74) *Attorney, Agent, or Firm*—Foley & Lardner LLP

(57) ABSTRACT

A folding-type electronic device that improves air tightness when the device is folded is provided. A first shell 12 and a second shell 22 are connected via connection portions 31, 33, 35 so that the first and second shells are folded, and when the first shell 12 and the second shell 22 are closed, the connection portions 31, 33, 35 are stored in an area surrounded by the first shell 12 and the second shell 22.

14 Claims, 3 Drawing Sheets

F I G . 1
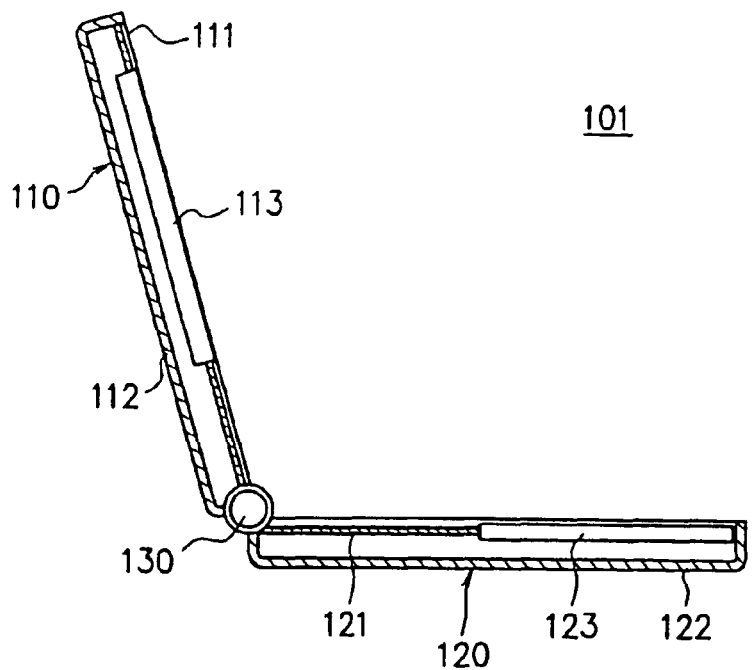
F I G . 2
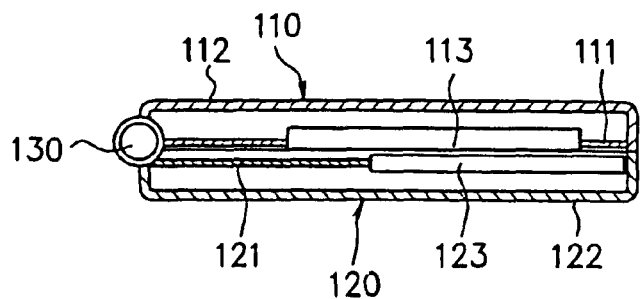
F I G . 3
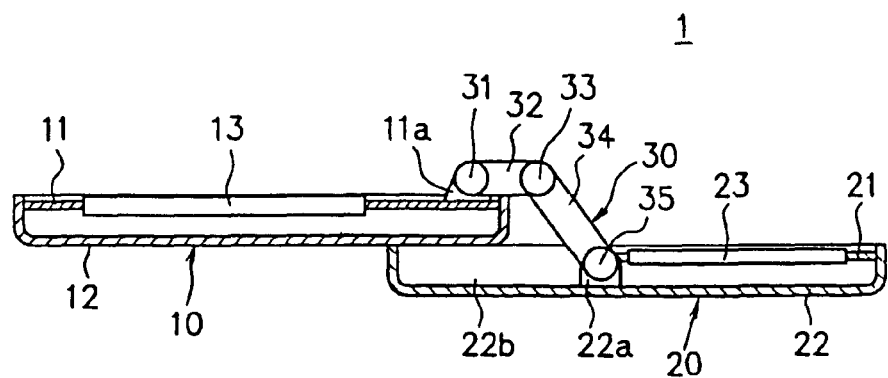

ELECTRONIC DEVICE

This application is the National Phase of PCT/JP2005/023826, filed Dec. 26, 2006, and published as WO 2006/073082, which in turn claims priority to Japanese Application No. 2006-001792, filed Jan. 6, 2005, the contents of which are incorporated herein by reference.

TECHNICAL FIELD

The present invention relates to an electronic device including two housings, the two housings being connected with a connection portion to be folded, and relates particularly to an electronic device with higher airtightness.

BACKGROUND ART

A conventional electronic device that can be folded, particularly a folding-type cellular phone 101, includes, as shown in FIG. 1, a first housing 110 that is assembled from a first lid 111 and a first shell 112, a second housing 120 that is assembled from a second lid 121 and a second shell 122, and a joint portion 130 connecting the first housing 110 and the second housing 120 to be folded. In the first housing 110, a display portion 113, a receiver, a circuit board (not shown) and the like are mounted. The first lid 111 has a window portion (not shown) for the display portion 113. In the second housing 120, an input button 123, a microphone, a circuit board (not shown) and the like are mounted. The second lid 121 has holes (not shown) for the input button 123. The joint portion 130 has a structure exposed to the outside together with the first housing 110 and the second housing 120 in the folded state (See FIG. 2). The circuit board in the first housing 110 and the circuit board in the second housing 120 are electrically connected by wires (not shown) through the connection portion 130.

Patent Document 1: Japanese Patent Laid-Open No. 2003-233435
Patent Document 2: Japanese Patent Laid-Open No. 2003-273992
Patent Document 3: Japanese Patent Laid-Open No. 8-332849
Patent Document 4: Japanese Patent Laid-Open No. 11-38716

The conventional folding-type cellular phone has a hinge member (not shown) that is fixed to each of the first housing 110 and the second housing 120 and is incorporated in the joint portion 130, but since the hinge member includes rubbed portions, it is difficult to make the rubbed portions airtight. Thus, there is a fear that the joint portion 130 cannot be protected from dusts and moisture in the air.

With the recent trend toward small-sized and light-weighted devices, a small-sized phone such as a pendant type suspended from the neck has emerged, but designability as well as dust resistance is required for this type of small-sized phone and it is necessary to constitute a joint portion so as not to ruin the appearance. Even in a case where a small-sized phone has a folding structure, if electric connection between the first housing side (or a cover) and the second housing side is not needed, the designability can be ensured by making the joint portion small. However, as for the folding-type cellular phone, when the electric connection between the circuit board on the first housing side and the circuit board on the second housing side is needed, if the joint portion is made smaller, it is necessary to provide an electric connection (wiring) portion at a portion separate from the joint portion, which impairs the appearance.

An objective of the present invention is to provide an electronic device that can improve airtightness when the device is folded.

DISCLOSURE OF THE INVENTION

According to a first aspect of the invention, an electronic device is configured such that a first shell and a second shell are connected via at least one connection portion so that the first shell and the second shell are folded, and when the first shell and the second shell are closed, the connection portion is stored in an area surrounded by the first shell and the second shell.

According to a second aspect of the invention, an electronic device comprises a first housing assembled from a first lid and a first shell, a second housing assembled from a second lid and a second shell, and a connecting member for connecting the first housing and the second housing so that the first housing and the second housing form an arbitrary angle, in which the second shell has space for storing the connecting member when the first housing and the second housing are folded, and a rim of the first shell is brought into contact with a rim of the second shell when the first housing and the second housing are folded.

According to a third aspect of the invention, an electronic device comprises a first housing assembled from a first lid and a first shell, a second housing, a second shell, a first connection portion that is arranged at one end of the second housing and connects the first housing and the second housing so that the first housing and the second housing are folded, and a second connection portion that is arranged at the other end of the second housing and connects the second housing and the second shell so that the second housing and the second shell are folded, and when the first housing, the second housing, and the second shell are folded, the second shell has storing space for storing the first connection portion, the second connection portion, and the second housing, and a rim of the first shell is brought into contact with a rim of the second shell when the first housing, the second housing, and the second shell are folded.

According to the invention, air tightness can be obtained when the housing is folded. Also, since the connection portion of the connecting member is not seen from the outside when being folded, the degree of freedom for design is improved, and the appearance of a device is adapted to suit various intended application. Also, assembling is easy and manufacturing costs can be reduced.

BRIEF DESCRIPTION OF THE DRAWINGS

FIG. 1 is a sectional view schematically illustrating the construction of a folding-type cellular phone according to a conventional example in an opened state;

FIG. 2 is a sectional view schematically illustrating the construction of a folding-type cellular phone according to a conventional example in a closed state;

FIG. 3 is a sectional view schematically illustrating the construction of a folding-type cellular phone according to a first embodiment in a fully opened state;

Figure 4:
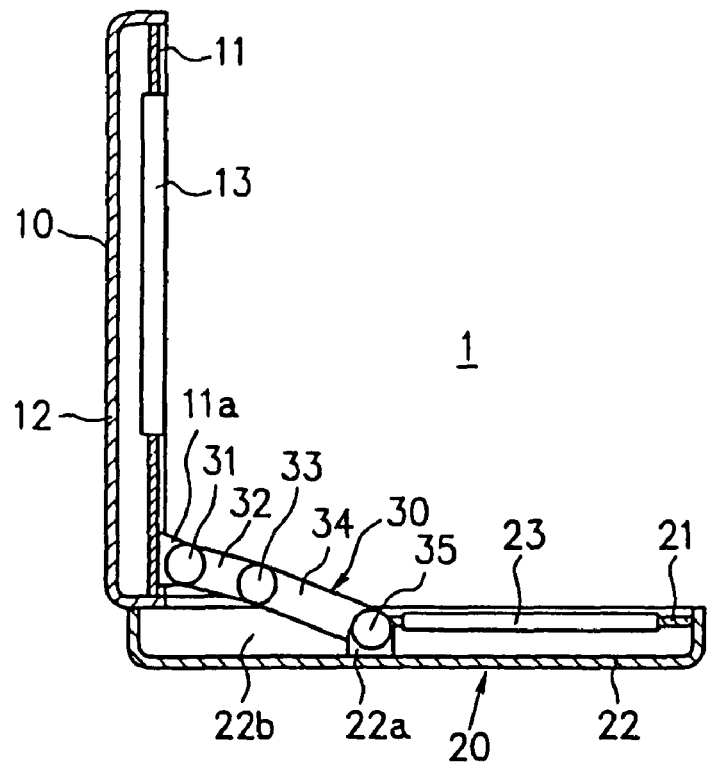
FIG. 4 is a sectional view schematically illustrating the construction of the folding-type cellular phone according to the first embodiment in a half-opened state.

DESCRIPTION OF SYMBOLS 1, 51, 101 Folding-type cellular phone (electronic device)
10, 60, 110 First housing
11, 61, 111 First lid
11a Connection portion
12, 62, 112 First shell
13, 63, 113 Display portion
20, 70, 120 Second housing
21, 121 Second lid
22, 80, 122 Second shell
22a Connection portion
22b, 80a Storing space
23, 71, 123 Input buttons
30 Connecting member
31 First hinge portion (connection portion)
32 First link
33 Second hinge portion (connection portion)
34 Second link
35 Third hinge portion (connection portion)
90 First connection portion
91 Second connection portion
130 Connection portion

BEST MODE FOR CARRYING OUT THE INVENTION

First Embodiment

Figure 5:
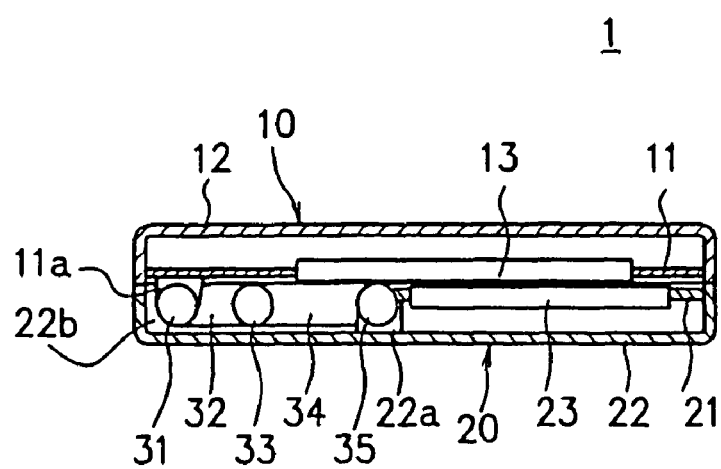
FIG. 5 is a sectional view schematically illustrating the construction of the folding-type cellular phone according to the first embodiment in a closed state.

A folding-type cellular phone according to a first embodiment of the present invention will be described with reference to the drawings. FIGS. 3 to 5 are sectional views illustrating the construction of the folding-type cellular phone according to the first embodiment of the present invention. FIG. 3 shows a fully opened state, FIG. 4 a half-opened state, and FIG. 5 a folded state.

A folding-type cellular phone 1 includes a first housing 10, a second housing 20, and a connecting member 30.

The first housing 10 is a housing is assembled from a first lid 11 and a first shell 12. On the first housing 10, electronic parts such as a display portion 13, a receiver, a circuit board (not shown) and the like are mounted. The first lid 11 is fitted with the first shell 12 in a predetermined area on the inner surface side of the first shell 12. Also, the first shell 11 has a connection portion 11a to be connected to the connecting member 30. Moreover, the first lid 11 has a window portion (not shown) for the display portion 13. The whole edge of the first shell 12 is bent to one side. Also, the edge of the first shell 12 is brought into contact with the edge of a second shell 22 to be sealed when the first housing 10 and the second housing 20 are folded. In order to obtain higher air-tightness, a seal member such as rubber may be attached to one or both of the edges of the first shell 12 and of the second shell 22.

The second housing 20 is assembled from a second lid 21 and a second shell 22. On the second housing 20, electronic parts such as input buttons 23, a microphone, circuit boards, a battery (not shown) and the like are mounted. The second lid 21 is fitted on an inner surface side of the second shell 22. The second lid 21 has a hole (not shown) for the input buttons 23. The whole peripheral edge of the second shell 22 is bent to one side. Also, on the inner surface side of the second shell 22 is a connection portion 22a that is connected to the connecting member 30. The second shell 22 has a storing space 22b for storing the connecting member 30 when the first housing 10 and the second housing 20 are folded. The storing space 22b is space inside the second shell 22 less the space that the second lid 21 covers. Moreover, when the first hosing 10 and the second housing 20 are folded, the perimeter of the second shell 22 is brought into contact with the perimeter of the first shell 12 so that the shells are hermetically closed.

The connecting member 30 provides a mechanism to connect the first housing 10 with the second housing 20 and enable the phone 1 to be folded (bending). The connecting member 30 has a structure that gives at least one angles at which the shells are fixed and is configured such that an angle made by the first housing 10 and the second housing 20 is 90 degrees or more when the phone 1 is opened. The connecting member 30 has a first hinge portion 31, a first link 32, a second hinge portion 33, a second link 34, and a third hinge portion 35. The first hinge portion 31 rotatably connects the first housing 10 and the first link 32. The first link 32 has the first housing 10 rotatably connected to one end by the first hinge portion 31 and the second link 34 to the other end by the second hinge portion 33. The second hinge portion 33 rotatably connects the first link 32 and the second link 34. The second link 34 has the first link 32 rotatably connected to one end by the second hinge portion 33 and the second housing 20 to the other end by the third hinge portion 35. The third hinge portion 35 rotatably connects the second housing 20 and the second link 34. The connecting member 30 is stored in the storing space 22b of the second shell 22 when the first housing 10 and the second housing 20 are folded. Moreover, in the connecting member 30, a wiring such as a flexible cable (not shown) is arranged for electrically connecting electronic parts mounted on the first housing 10 and the electronic parts mounted on the second housing 20.

An operation of the folding-type cellular phone according to the first embodiment will be described. When the folding-type cellular phone 1 is to be used, as shown in FIGS. 3 and 4, the first housing 10 and the second housing 20 are opened. When the folding-type cellular phone 1 is not in use, the first housing 10 and the second housing 20 are folded as shown in FIG. 5. When the first housing 10 and the second housing 20 are folded, the first lid 11, the second lid 21 and the connecting member 30 are stored in an area surrounded by the first shell 12 and the second shell 22. That is, when the first housing 10 and the second housing 20 are folded, only the first shell 12 and the second shell 22 are exposed.

According to the first embodiment, when the first housing 10 and the second housing 20 are folded, air tightness can be ensured. Also, since the connecting member 30 is not seen from the outside when the phone 1 is folded, the designability can be ensured.

Second Embodiment

Figure 6:
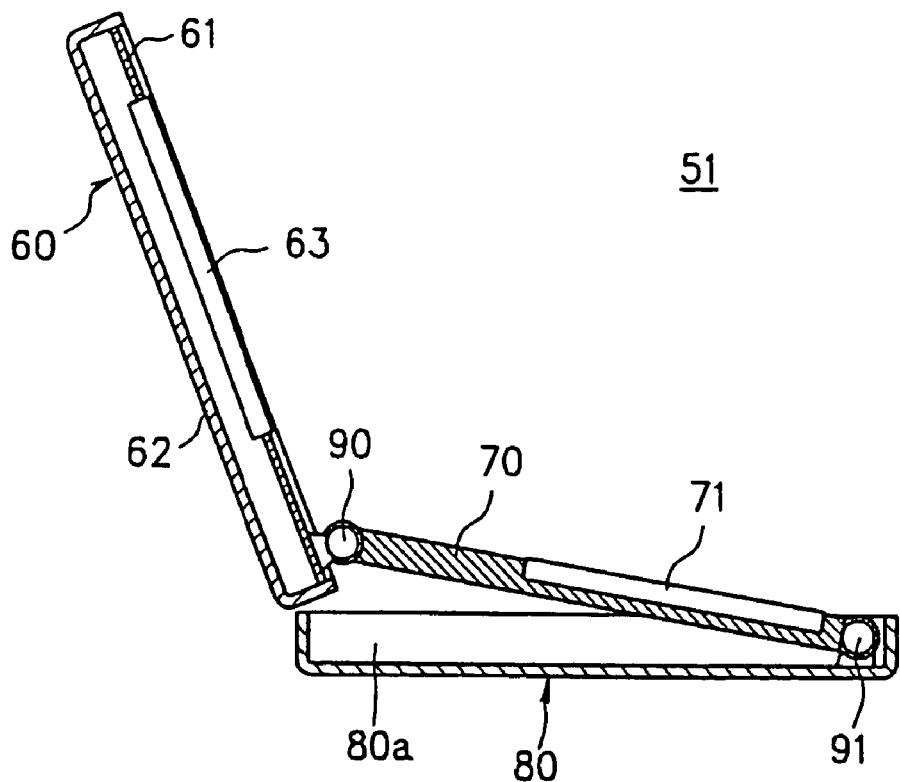
FIG. 6 is a sectional view schematically illustrating the construction of a folding-type cellular phone according to a second embodiment in an opened state.
Figure 7:
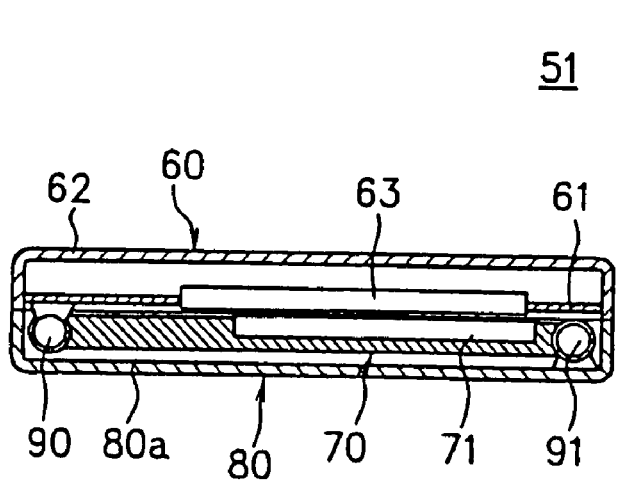
FIG. 7 is a sectional view schematically illustrating the construction of the folding-type cellular phone according to the second embodiment in a closed state.

Next, a folding-type cellular phone according to a second embodiment of the present invention will be described using the attached drawings. FIGS. 6 and 7 are sectional views schematically illustrating the structure of the folding-type cellular phone according to the second embodiment of the present invention. FIG. 6 shows an opened state and FIG. 7 shows a folded state.

A folding-type cellular phone 51 has a first housing 60, a second housing 70, a second shell 80, a first connection portion 90, and a second connection portion 91.

The first housing 60 is assembled from a first lid 61 and a first shell 62. On the first housing 60, a display portion 63, a receiver, a circuit board (not shown) and the like are mounted. The first lid 61 is fitted inside the first shell 62. Also, the first lid 61 is connected to the second housing 70 via the first connection portion 90. Also, the first lid 61 has a window portion (not shown) for a display portion 63. The whole peripheral edge of the first shell 62 is bent toward one side. Also, the rim of the first shell 62 is brought into contact with the rim of a second shell 80 so that the phone 51 is hermetically closed when the first housing 60, the second housing 70, and the second shell 80 are folded. In order to obtain higher air tightness, a seal member such as rubber may be attached to one or both of the rim of the first shell 62 and the rim of the second shell 80.

The first connection portion 90 rotatably joins one end of the second housing 70 to the first housing 60. The connection portion 91 joins the other end of the second housing 70 to the second shell 80. On the second housing 70, input buttons 71, a microphone, circuit boards, a battery (not shown) and the like are mounted. On the second housing 70, a hole (not shown) is provided for the input buttons 71 on the surface opposed to the first lid 61 when being folded.

The entire peripheral edge of the second shell 80 is bent toward one side. Also, the second shell 80 is connected to the second housing 70 via the second connection portion 91 on the inner surface side. Also, the second shell 80 has storing space 80a for storing the first connection portion 90, the second connection portion 91, and the second housing 70 when the phone 51 is folded. Moreover, the rim of the second shell 80 is brought into contact with the rim of the first shell 62 so that the phone 51 is hermetically sealed.

The first connection portion 90 is a hinge portion that rotates and connects the first housing 60 and the second housing 70. The second connection portion 91 is a hinge portion rotatably connecting the second housing 70 and the second shell 80 to each other. The second connection portion 91 is preferably provided with means (not shown) that fixes the housing 60 and the shell 80 at given angles in a stepwise manner when the second housing 70 and the second shell 80 are opened.

According to the second embodiment, air tightness can be ensured when the first housing 60, the second housing 70 and the second shell 80 are folded. Also, since the connection portions 90, 91 are not seen from the outside when they are folded, designability can be improved.

The invention claimed is:

1. An electronic device comprising:
   a first shell; and
   a second shell,
   wherein the first shell and the second shell are connected via two connecting members such that the first shell and the second shell can be folded,
   wherein one of the two connecting members is located on each side of the first and second shell, and each connecting member includes at least two linking portions and at least two hinge portions, and
   wherein the two connecting members are each stored in an area surrounded by the first shell and the second shell when the first shell and the second shell are closed.

2. The electronic device according to claim 1, wherein a seal member is attached to a rim of the first shell a rim of the second shell.

3. The electronic device according to claim 1, wherein the electronic device is a folding-type cellular phone.

4. An electronic device comprising:
   a first housing assembled from a first lid and a first shell;
   a second housing assembled from a second lid and a second shell; and
   two connecting members connecting the first housing and the second housing such that the first housing and the second housing can fold to form an angle with respect to the first housing and second housing,
   wherein the second shell has storing space for storing the two connecting members when the first housing and the second housing are folded;
   wherein one of the two connecting members is located on each side of the first and second shell, and each connecting member includes at least two linking portions and at least two hinge portions, and
   wherein a rim of the first shell is brought into contact with a rim of the second shell when the first housing and the second housing are folded.

5. The electronic device according to claim 4, wherein each connecting member includes three hinge portions.

6. The electronic device according to claim 4, wherein the angle with respect to the first housing and second housing is 90 degrees.

7. The electronic device according to claim 4, further comprising a wiring that is disposed in at least one of the connecting members and electrically connects a first electronic part mounted on the first housing and a second electronic part mounted on the second housing to each other.

8. The electronic device according to claim 4, wherein in the first housing and the second housing, a display portion is mounted on one of the housings, while input buttons are mounted on the other housing.

9. The electronic device according to claim 4, wherein a seal member is attached to one or both of the rim of the first shell and the rim of the second shell.

10. The electronic device according to claim 4, wherein the electronic device is a folding-type cellular phone.

11. An electronic device comprising:
    a first housing assembled from a first lid and a first shell;
    a second housing;
    a second shell;
    a first connecting member that is arranged at one end of the second housing and connects the first housing and the second housing such that the first housing and the second housing can be folded; and
    a second connecting member that is arranged at the other end of the second housing and connects the second housing and the second shell such that the second housing and the second shell can be folded,
    wherein the second shell has storing space for storing the first connecting member, the second connecting member, and the second housing when the first housing, the second housing, and the second shell are folded;
    wherein each connecting member includes at least two linking portions and at least two hinge portions, and
    wherein a rim of the first shell is brought into contact with a rim of the second shell when the first housing, the second housing, and the second shell are folded.

12. The electronic device according to claim 11, wherein in the first housing and the second housing, a display portion is mounted on one of the housings, while input buttons are mounted on the other housing.

13. The electronic device according to claim 11, wherein a seal member is attached to one or both of the rim of the first shell and the rim of the second shell.

14. The electronic device according to claim 11, wherein the electronic device is a folding-type cellular phone.

* * * * *